United States Patent [19]

Katahira et al.

[11] 4,143,952
[45] Mar. 13, 1979

[54] APERTURE ASSEMBLY

[75] Inventors: Yukio Katahira, Sayama; Toshiaki Morimoto, Kokubunji, both of Japan

[73] Assignee: Nihon Beru-Haueru Kabushiki Kaisha (Bell & Howell Japan, Ltd.), Higashimurayama, Japan

[21] Appl. No.: 806,389

[22] Filed: Jun. 13, 1977

[30] Foreign Application Priority Data

Jun. 19, 1976 [JP] Japan .................. 51/080527[U]

[51] Int. Cl.$^2$ ................................. G03B 1/48
[52] U.S. Cl. ................................. 352/221; 352/72; 352/224
[58] Field of Search .............. 352/221, 224, 72, 78 R

[56] References Cited

U.S. PATENT DOCUMENTS

| 3,612,672 | 10/1971 | Carlso ............................ 352/221 |
| 3,720,461 | 3/1973 | Reinsch .......................... 352/224 |
| 3,954,330 | 5/1976 | Sakaguchi ....................... 352/224 |

Primary Examiner—Monroe H. Hayes
Attorney, Agent, or Firm—John H. Moore; Roger M. Fitz-Gerald

[57] ABSTRACT

An aperture assembly is described for use in a motion picture camera, particularly a camera using film cartridges and requiring an aperture assembly with a very thin profile. The aperture assembly includes a thin metal base plate to provide strength for the assembly and for alignment of aperture components thereon. The aperture components include a thin molded aperture piece and a pair of thin molded cartridge alignment shoulders, all mounted on one side of the base plate. The base plate and the aperture piece both have aligned exposure windows through which the film is exposed and aligned slits for receiving a shuttle tooth for advancing the film. Each of the cartridge alignment shoulders has an internal groove communicating with a slit in the base plate for receiving a shuttle foot. A shuttle and a side tension member for use with the aperture assembly are also described.

7 Claims, 4 Drawing Figures

APERTURE ASSEMBLY

BACKGROUND OF THE INVENTION

The invention described herein is directed generally to motion picture cameras and more specifically to aperture assemblies for such cameras.

In conventional motion picture cameras, a structure known as an aperture assembly is disposed between the lens of the camera and film. The primary functions of the aperture assembly are to provide an aperture window through which the film is exposed, to hold the film in alignment with the aperture window, and to hold a film advancement mechanism, usually a shuttle claw, in registry with the film.

It will be appreciated that the aperture assembly must be made very precisely in order to hold the film and shutter claw in their desired registry. The precision in manufacture must, however, be accompanied by economy in manufacture. Toward that end, aperture assemblies have been molded to lower manufacturing expenses. Frequently, however, molded aperture assemblies do not have sufficient strength for their intended use.

Recent developments in the production of highly sensitive film have made possible the use of cameras in low light conditions without movie lamps. Such cameras generally require that the distance between the lens and the film be smaller than the corresponding distance usually found in cameras using less sensitive film. Because of this decrease in the distance between the lens and the film, the aperture assembly must be made correspondingly thinner. Prior molded aperture assemblies, already lacking in the desired degree of strength, become even weaker when their thickness must be reduced for use in cameras designed for use in low light conditions.

OBJECTS OF THE INVENTION

It is a general object of this invention to provide an aperture assembly which overcomes the above-noted deficiencies of prior aperture assemblies.

It is a more specific object of the invention to provide a thin but strong aperture assembly having molded parts, which assembly maintains a high degree of registry between the film and the aperture window and between the film and the film advancement mechanism.

BRIEF DESCRIPTION OF THE DRAWINGS

These and other objects of the invention are more particularly set forth in the following detailed description and in the accompanying drawings of which.

DESCRIPTION OF THE PREFERRED EMBODIMENT

Figure 1:
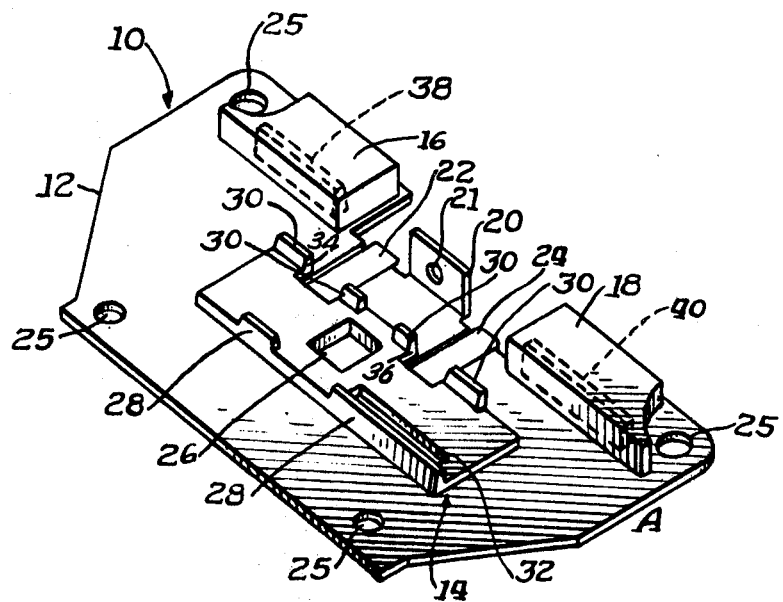
FIG. 1 is a perspective view of the top side of an aperture assembly in accordance with the invention.

Referring now to FIG. 1, there is shown an aperture assembly 10 embodying various aspects of the invention. The aperture assembly 10 includes a thin metal base plate 12 which provides the main support for the components of the assembly 10 and which maintains registry among those components.

Affixed to the illustrated top side of the base plate 12 are an aperture piece 14 and a pair of alignment shoulders 16 and 18. The base plate 12 also includes an upstanding flange 20 having a hole 21 and a pair of elongated depressions 22 and 24, the functions of which are described hereinafter. A plurality of holes 25 are formed in the base plate 12 for securing it to the camera body.

Referring more specifically to the aperture piece 14, it is a thin molded piece elongated in the direction of film feed with an exposure window 26. The exposure window 26 is in alignment with an underlying opening in the base plate 12 and defines the exposure area of the film which is transported along the elongated dimension of the aperture piece 14.

To hold the film in registry with the exposure window 26, the aperture piece 14 includes a plurality of integrally molded film guide protuberances 28 and 30 extending normally with respect to the top side of the base plate 10. The protuberances 28 are located at one side of the exposure window 26 while the protuberances 30 are located on the opposite side thereof. With this arrangement, the film is held between the protuberances 28 and 30 and in proper registry with the exposure window 26.

Engagement between the film and a shuttle claw is provided by means of a slit 32 which is elongated in the direction of film feed and which overlies an opening in the base plate 10. As will be described in more detail below, a shuttle claw will extend from the bottom side of the base plate 10 upwardly through the slit 32 for engagement with the film. The shuttle claw reciprocates in the slit 32 and advances the film a frame at a time past the exposure window 26.

Also formed in the aperture piece 14 are a pair of indentations 34 and 36 which are aligned with the depressions 22 and 24, respectively, in the base plate 12 for receiving the arms of a side tension member to be described.

Preferably, the aperture piece 14 is molded on the base plate 12 by a so-called insert molding method or an outsert molding method. Alternately, the aperture piece may be fixed to the base plate 12 by conventional fasteners.

Referring now to the shoulders 16 and 18, they are located on the base plate 12 so as to properly align a film cartridge when the cartridge is inserted into the camera. That is, the shoulders 16 and 18 serve as "stoppers" for a film cartridge to ensure that the picture window of the cartridge is in registry with the exposure window 26.

Another function served by the shoulders 16 and 18 is to receive the shuttle feet of the shuttle which advances the film. Toward this end, the shoulders 16 and 18 have internal, downwardly opening, elongated grooves 38 and 40, respectively. The grooves 38 and 40 overlie corresponding elongated openings in the base plate 10 so that a shuttle foot may extend upwardly through each of the elongated openings in the base plate 12 and into each of the grooves 32 and 40 for reciprocation therein.

Figure 3:
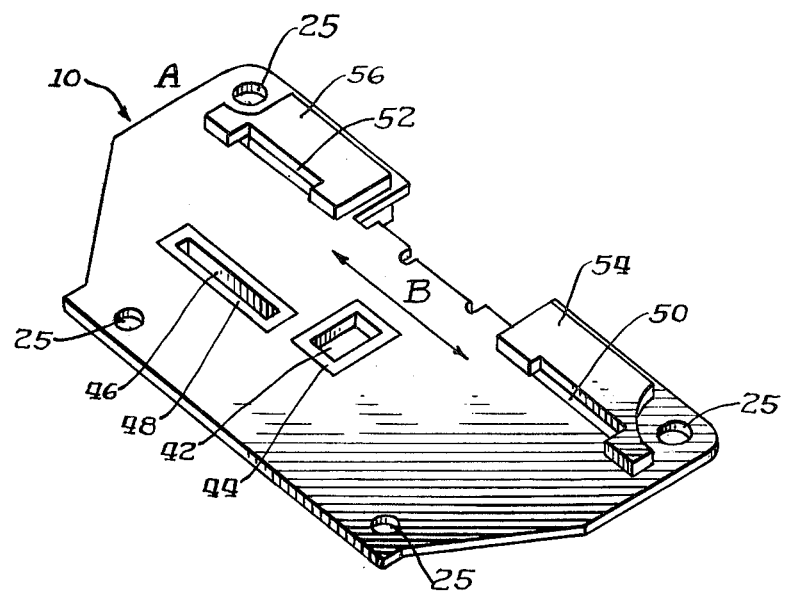
FIG. 3 is a perspective view of the bottom side of the aperture assembly of FIG. 1.

The bottom side of the base plate 12 is shown in FIG. 3 wherein the end A of the base plate 10 corresponds to the same end indicated as A in FIG. 1. The view shown in FIG. 3 illusrates an exposure window 42 in the base plate 12, which window 42 is in registry with the exposure window 26 in the aperture piece 14. A flange portion 44 of the aperture piece 14 extends through the window 42 and is shaped flush against the bottom side of the base plate 12.

Also shown in FIG. 3 is an elongated slit 46 which is in registry with the slit 32 in the aperture piece 14. A flange portion 48 of the aperture piece 14 is flush against the bottom side of the base plate 12.

The feet of a shuttle are received by a pair of elongated openings 50 and 52 which are in registry with the grooves 38 and 40 of the shoulders 16 and 18. Adjacent the openings 50 and 52 are protuberances 54 and 56 which are integrally molded with the shoulders 18 and 16, respectively. The protuberances 54 and 56, along with the shoulders 16 and 18, are molded on the base plate 12 by the insert or outsert molding method.

Figure 2:
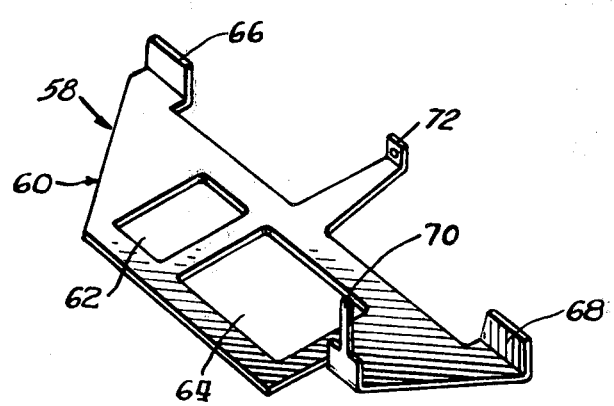
FIG. 2 is a perspective view of a film advancement shuttle for use with the aperture assembly of FIG. 1.

Referring now to FIG. 2, there is shown a shuttle 58 for use with the aperture assembly 10. The shuttle 58 includes a planar body portion 60, a pair of openings 62 and 64, a pair of shuttle feet 66 and 68, a shuttle claw 70, and an arm 72. The shuttle 58 serves to advance the film a frame at a time by engaging the claw 70 with perforations in the film and reciprocating in a conventional manner. The movement of the shuttle 58 is controlled by a spring (not shown) which is coupled to the arm 72.

The shuttle 58 is mated to the aperture assembly 10 by inserting the shuttle feet 66 and 68 through the openings 50 and 52 in the base plate 10 and into the grooves 38 and 40 in the shoulders 16 and 18. The shuttle claw 70 is inserted through the slit 46 in the base plate 12 and into the slit 32 in the aperture piece 14. Thus, the body portion 60 of the shuttle 58 will be flush against the bottom side of the base plate 12 for reciprocation in the direction of the arrow B (FIG. 3). When so situated, the opening 64 in the shuttle 58 will provide a light path from the lens through the exposure window 42 to the film.

Figure 4:
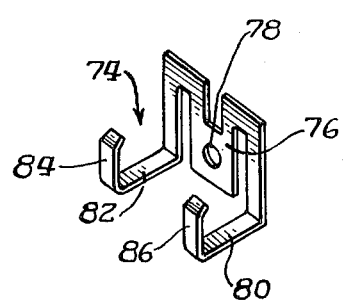
FIG. 4 is a perspective view of a side tension member for use with the aperture assembly of FIG. 1.

Referring now to FIG. 4, there is shown a U-shaped side tension member 74 having a support bracket 76, a hole 78 for fastening the bracket 76 to the base plate 12, a pair of elongated feet 80, 82, and a pair of upstanding film engagement arms 84 and 86. The shuttle is mated with the aperture assembly 10 by situating the feet 80 and 82 into the depressions 22 and 24 of the base plate 10 such that the arms 84 and 86 mate with the indentations 34 and 36 in the aperture piece 14. The tension member 74 is secured in place by passing a fastener through the hole 78 in the tension member 74 and through the hole 21 in the flange 20. When so situated, the arms 84 and 86 of the spring tension member 74 press the film against the film guide protuberances 28 on the aperture piece 14 and help maintain the film cartridge in its correct position.

The above-described aperture assembly provides a thin yet strong and inexpensive assembly for use in motion picture cameras. The strength of the aperture assembly derives from the fact that the base plate 12 is metal. This permits the aperture piece 14 and the shoulders 16 and 18 to be thin molded pieces without detracting from the over-all strength of the aperture assembly. Further, excellent alignment among the various components, i.e., the aperture piece 14, the shuttle 58, and the side tension member 74 is obtained by virtue of all of these components being referenced to the base plate 12.

Although this invention has been described in terms of a specific structure, it will be obvious to one skilled in the art that many alterations and modifications may be made to the illustrated structure without departing from the spirit and scope of the invention. Accordingly, it is intended that all such modifications and alterations be included within the scope of the appended claims.

What is claimed is:

1. In a motion picture camera for transporting cartridge-contained film past an aperture by means of a shuttle having a film advancement claw for advancing the film and a pair of shuttle feet, a thin aperture assembly for holding the film in alignment with the aperture and for holding the shuttle in alignment with the film, comprising:
   a thin metal base plate having top and bottom sides, an exposure window, a slit elongated in the direction of film feed for receiving a shuttle claw from the bottom side of said base plate, and a pair of elongated openings spaced apart in the direction of film feed;
   a thin, molded aperture piece fixedly mounted on the top side of said base plate and having an exposure window and a shuttle claw slit aligned, respectively, with the exposure window and slit of said base plate;
   a pair of cartridge alignment shoulders fixedly disposed on the top side of said base plate, each shoulder situated over one of the elongated openings in said base plate and having an internal, downwardly opening, elongated groove aligned with one of the elongated openings in said base plate for receiving a shuttle foot extending from the bottom side of said base plate;
   whereby a thin yet strong aperture assembly is provided for maintaining alignment among the film, the exposure window and the shuttle.

2. An aperture assembly as set forth in claim 1 wherein said aperture piece includes a plurality of integrally molded film guide protuberances extending normally to the top side of said base plate and disposed on both sides of the exposure window in said aperture piece.

3. An aperture assembly as set forth in claim 1 for use in a motion picture camera having a side tension guide with a pair of film-engaging arms for pressing against one edge of the film to maintain registry of the film with the aperture window, wherein said base plate includes a pair of depressions in its top side for receiving the film engaging arms of the side tension guide, said depressions being aligned with one another in the direction of film feed and disposed on opposite sides of the aperture window.

4. An aperture assembly as set forth in claim 3 wherein said aperture piece has an elongated edge facing said depressions, said edge having a pair of indentations in alignment with said pair of depressions for seating the arms of the side tension guide.

5. In a motion picture camera for transporting film contained in a film cartridge past an aperture, an aperture and film advancement assembly, comprising:
   a thin metal base plate having top and bottom sides, an exposure window, a shuttle claw slit elongated in the direction of film feed, and a pair of elongated openings spaced apart in the direction of film feed;
   a thin, molded aperture piece fixedly mounted on the top side of said base plate and having an exposure window and a shuttle claw slit aligned respectively with the exposure window and slit of said base plate;
   a pair of cartridge alignment shoulders fixedly disposed on the top side of said base plate, each shoulder situated over one of the elongated openings in said base plate and having an internal, downwardly opening groove aligned with one of the elongated openings in said base plate;

a shuttle having a substantially planar body portion, a shuttle claw and a pair of shuttle feet extending normally to the body portion, said shuttle being disposed for sliding motion on the bottom side of said base plate and contoured such that the shuttle claw extends upwardly through the shuttle claw slits in said base plate and aperture piece for engagement with the film and the shuttle feet extend upwardly through the elongated openings in said base plate and into the downwardly opening grooves in said shoulders.

6. An assembly as set forth in claim 5 further including a U-shaped side tension guide having a pair of bottom feet for engagement with the top side of said base plate, a pair of film engagement arms extending substantially normally from the ends of said bottom feet and a support bracket extending normally from the opposite ends of said bottom arms, and wherein said base plate includes a pair of depressions extending transversely to said aperture piece and to the direction of film feed, one depression on each side of the aperture window for receiving the bottom arms of said side tension guide, and an upstanding flange for securing the support bracket of said side tension member to said base plate, whereby the film engagement arms of said side tension member are fixedly disposed relative to the aperture window for holding the film in proper registry.

7. An assembly as set forth in claim 6 wherein said aperture piece includes a plurality of integrally molded film guide protuberances extending normally to the top side of said base plate and disposed on opposite sides of the exposure window in said aperture piece.

* * * * *